US009995254B1

(12) United States Patent
Ringelstetter

(10) Patent No.: US 9,995,254 B1
(45) Date of Patent: Jun. 12, 2018

(54) DEVICE USED WITH THE AIR INDUCTION TUBE OF AN INTERNAL COMBUSTION ENGINE AFTER THE AIR FILTER AND BEFORE THE THROTTLE BODY

(71) Applicant: Allen Francis Ringelstetter, Friesland, WI (US)

(72) Inventor: Allen Francis Ringelstetter, Friesland, WI (US)

( * ) Notice: Subject to any disclaimer, the term of this patent is extended or adjusted under 35 U.S.C. 154(b) by 11 days.

(21) Appl. No.: 15/188,774

(22) Filed: Jun. 21, 2016

Related U.S. Application Data

(60) Provisional application No. 62/183,892, filed on Jun. 24, 2015.

(51) Int. Cl.
*F02M 35/10* (2006.01)

(52) U.S. Cl.
CPC ......... *F02M 35/10262* (2013.01); *F02M 35/10124* (2013.01); *F02M 35/10367* (2013.01)

(58) Field of Classification Search
CPC ....... F02M 35/10262; F02M 35/10367; F02M 35/10124
See application file for complete search history.

(56) References Cited

U.S. PATENT DOCUMENTS

| | | | |
|---|---|---|---|
| 4,255,124 A * | 3/1981 | Baranowski, Jr. .... | B01F 5/0617 239/466 |
| 5,758,614 A | 6/1998 | Choi | |
| 5,924,398 A | 7/1999 | Choi | |
| 6,439,540 B1 * | 8/2002 | Tse ............. | F02D 9/02 251/118 |
| 7,146,961 B1 | 12/2006 | Westcott | |
| 7,690,349 B2 | 4/2010 | Bolanos | |
| 2004/0031471 A1 * | 2/2004 | Leuenberger ......... | F02M 29/06 123/590 |
| 2005/0045418 A1 | 3/2005 | Choi et al. | |
| 2013/0228146 A1 * | 9/2013 | Emler ................... | F02M 35/10 123/184.21 |
| 2015/0052748 A1 | 2/2015 | Peterson | |

OTHER PUBLICATIONS 3.25 OD MAF Housing air straightener for GM Camaro cold-air intake turbo 82mm OD, as viewed at http://www.ebay.com/itm/like/252222400081?catId=6000&item=252222400081&rmvSB=true on Mar. 4, 2016 (4 pages).

(Continued)

*Primary Examiner* — Jacob Amick
(74) *Attorney, Agent, or Firm* — Brannen Law Office, LLC

(57) ABSTRACT

Provided is a device used in the air induction tube of an internal combustion engine after the air filter and before the throttle body, and in particular to a device used to separate an air flow into a plurality of segments. The device can be made of two pieces. Each piece is initially a flat plate. A slit is formed half way through each plate and the corners are cut off or clipped. Each plate is then formed to have two generally curved portions. The pieces are joined via the slits resulting in the device. The pieces are generally perpendicular to each other at their intersection. The device is fitted into the air induction tube upstream of the throttle body, whereby it separates the air flow into distinct segments. The curved walls can be slightly compressed when inserted into an induction tube to hold the assembly in place.

16 Claims, 4 Drawing Sheets

(56) References Cited

OTHER PUBLICATIONS

Power X-Wing, as viewed at http://boysesen.com/news_detail.php?id=27 on Mar. 4, 2016 (3 pages).
Corksport, Mazdaspeed 3 SRI State II Power Series Short Ram Intake as viewed at http://corksport.com/corksport-power-series-short-ram-intake-2010-mazdaspeed-3.html on Mar. 4, 2016 (6 pages).
SRT Intake w/ Air Straightener w/ PIX as viewed at http://my.is/forums/f88/srt-intake-w-air-straightener-w-pix-517834/ on Mar. 4, 2016 (11 pages).

* cited by examiner

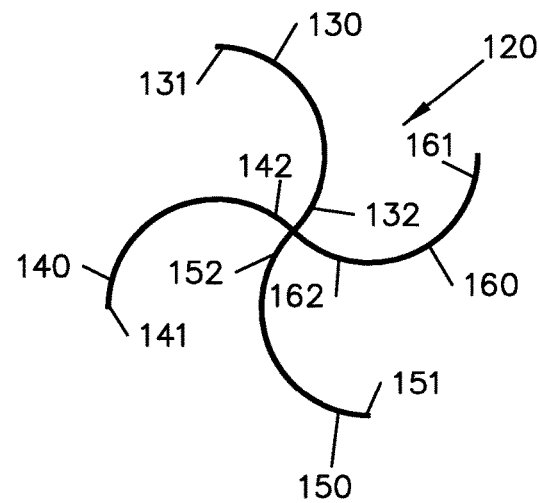
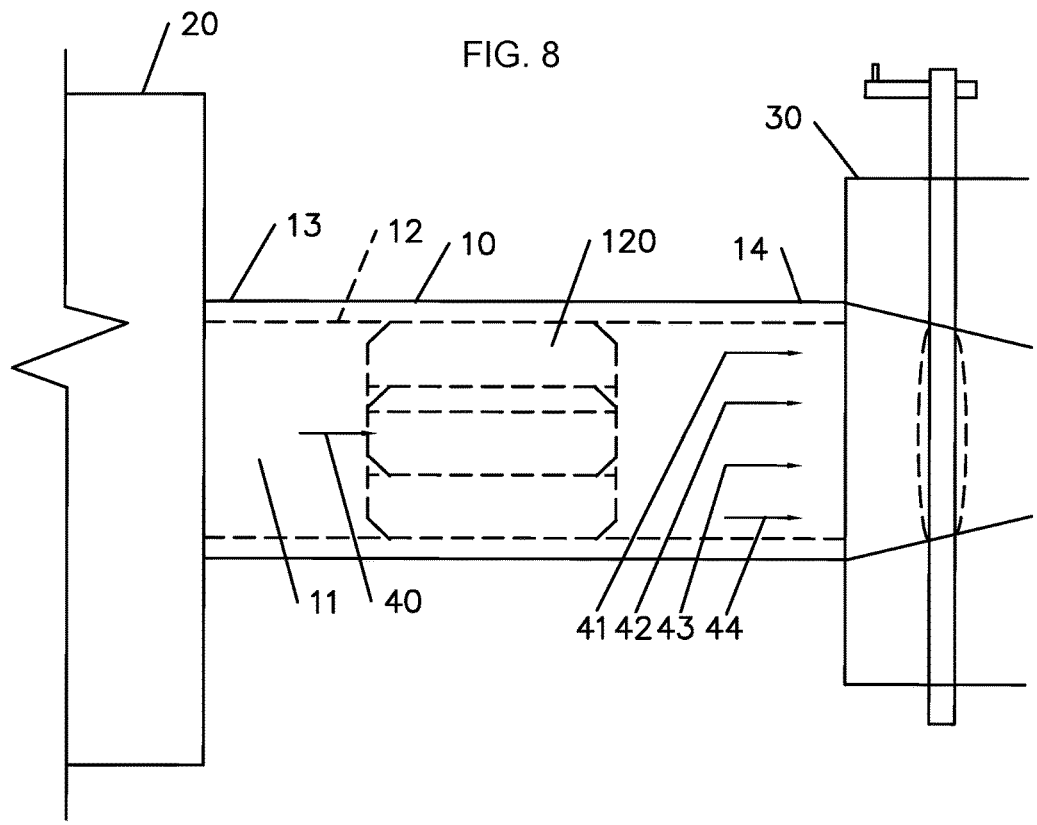

DEVICE USED WITH THE AIR INDUCTION TUBE OF AN INTERNAL COMBUSTION ENGINE AFTER THE AIR FILTER AND BEFORE THE THROTTLE BODY

This United States utility patent application claims priority on and the benefit of provisional application 62/183,892 filed Jun. 24, 2015, the entire contents of which are hereby incorporated herein by reference.

BACKGROUND OF THE INVENTION

1. Field of the Invention

The present invention relates to a device used with the air induction tube of an internal combustion engine after the air filter and before the throttle body, and in particular to a device used to separate an air flow into a plurality of segments.

2. Description of the Related Art

Engines can have an air filter that to filter air before it enters a combustion chamber of the engine. The air filter is typically held in a box (or housing) and is upstream of a throttle body. The throttle body regulates how much air can enter the combustion chamber through an intake manifold and contains a valve. An air induction tube is generally located between the air filter box and the throttle body.

Turbulence in the air flow before the throttle body results in less than optimal air flow through the throttle body and ultimately a less then fully desirable charge of air entering the engine. It is desirable to improve upon the efficiency of these systems.

Thus there exists a need for a device that solves these and other problems.

SUMMARY OF THE INVENTION

Provided is a device used in the air induction tube of an internal combustion engine after the air filter and before the throttle body, and in particular to a device used to separate an air flow into a plurality of segments. The device can be made of two pieces. Each piece is initially a flat plate. A slit is formed half way through each plate and the corners are cut off or clipped. Each plate is then formed to have two generally curved portions. The pieces are joined via the slits resulting in the device. The pieces are generally perpendicular to each other at their intersection. The device is fitted into the air induction tube upstream of the throttle body, whereby it separates the air flow into distinct segments. The curved walls can be slightly compressed when inserted into an induction tube to hold the assembly in place.

According to one advantage of the present invention, the air can be divided into four separate and distinct air flow segments. This advantageously allows the air to be more laminar (less turbulent) immediately before the throttle body which allows a greater amount of air to pass through the throttle body. Air also passes through the throttle body with less restriction allowing the engine cylinders to receive a greater charge of air.

The increased charge of air increases the torque range of the engine, increases horsepower, improves engine efficiency and eliminates a low end lag in acceleration. It is important to note that these benefits of increased charge are achieved even with a normally aspirated engine (i.e. even without turbo or super charging). In a dyno test of the illustrated embodiment of the present invention used within a 3-inch air intake tube, a 5-7% increase in rear wheel horsepower was observed.

All four corners of each piece of the device can be clipped or otherwise clipped or cut to eliminate sharp 90 degree angles at the ends of the device. This reduces the risks of damage to the induction tube upon installation and removal.

The device has four walls, each preferably having a curved profile. The curved profile of each wall is similarly oriented. This allows the walls to act as springs to frictionally hold the device in place against the inside of the air induction tube wall.

A still further advantage is that the installation is made without any modifications to the air intake tube and without any special tools.

A still further advantage yet of the present invention is that the curved walls create a curved air flow profile upstream of the throttle body.

Other advantages, benefits, and features of the present invention will become apparent to those skilled in the art upon reading the detailed description of the invention and studying the drawings.

BRIEF DESCRIPTION OF THE DRAWINGS

FIG. 7 is an end view of a formed device of the present invention.

FIG. 8 is a side view of the device of the present invention in an intended environment upstream of a throttle body.

DETAILED DESCRIPTION OF THE PREFERRED EMBODIMENTS

Figure 1:
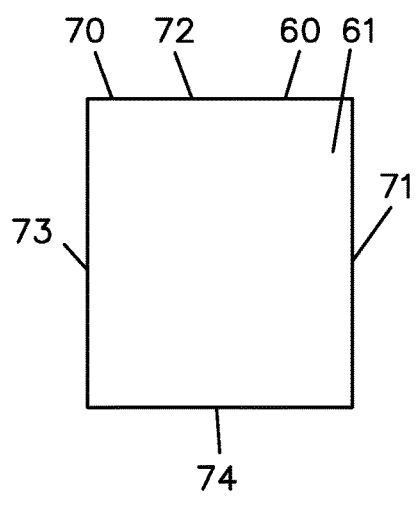
FIG. 1 is a side view of a first piece of material used to form the first piece of the device.

While the invention will be described in connection with one or more preferred embodiments, it will be understood that it is not intended to limit the invention to those embodiments. On the contrary, it is intended to cover all alternatives, modifications and equivalents as may be included within the spirit and scope of the invention as defined by the appended claims.

Most air induction tubes 10 range from 1-6 inches in diameter. For sake of example, a 3-inch tube will be illustrated. The tube 10 has an inside 11 with a perimeter wall 12 that has a generally circular profile. The tube 10 has two opposed ends 13 and 14.

An air filter box 20 is at one end 13 of the air induction tube 10 and a throttle body 30 is at the opposite end 14 of the induction tube 10. The throttle body 30 controls the amount of air that enters the engine.

Figure 2:
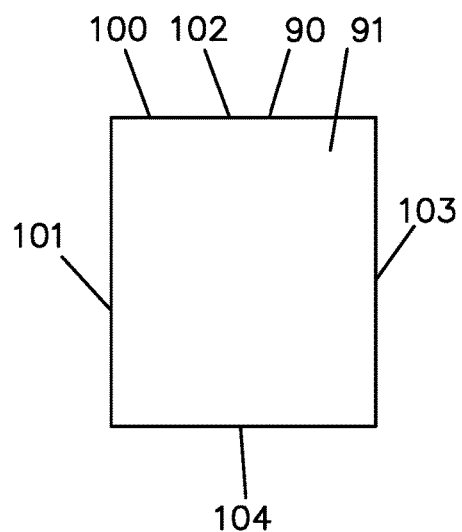
FIG. 2 is a side view of a second piece of material used to form the second piece of the device.

The device 50 is formed from two pieces 60 and 90, respectively. A blank unformed stock that will become piece 60 is illustrated in FIG. 1. A blank unformed stock that will become piece 90 is illustrated in FIG. 2. In order to construct the device 50, two pieces of stock measuring 3×3.5 inch and 0.018 inch in thickness are provided. The pieces can be made of any suitable material, including aluminum, steel, plastic (polypropylene or other) or other materials. It is understood that some plastics may be molded instead of formed to achieve the end shape of the device of the present invention.

Figure 3:
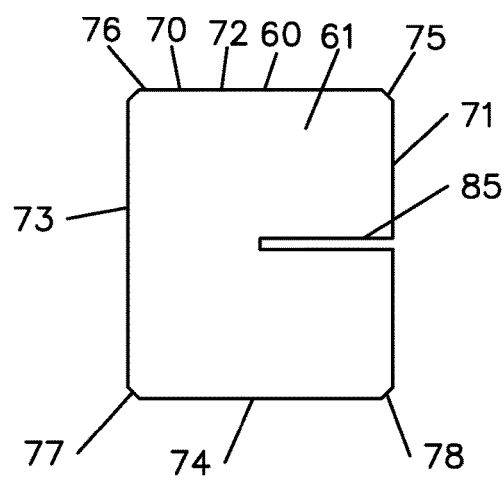
FIG. 3 is a side view of the first piece of material with a slit formed and the corners clipped.

Looking now at FIG. 3, it is seen that piece 60 has a plate 61 with a body 70 having four edges 71, 72, 73 and 74, respectively. Each of the four respective corners 75, 76, 77 and 78 are clipped, cut or otherwise removed to eliminate a right angle corner that can be sharp. A slit 85 is formed inward from edge 71 approximately ½ way to edge 73. The slit 85 is preferably located approximately ½ way between edges 72 and 74 and is generally aligned generally parallel to these edges. While ends clipped at approximately 45 degrees are illustrated, the angle of clip could vary without departing from the broad aspects of the present invention. Further, the corners could have a different shape (e.g. round, curved, poly-line, etc.) without departing from the broad aspects of the present invention.

Figure 4:
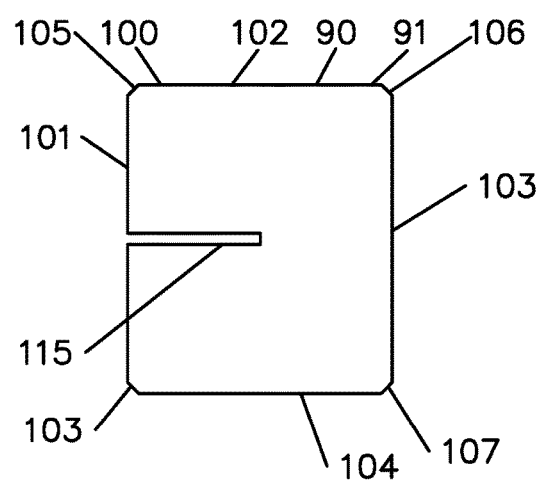
FIG. 4 is a side view of the second piece of material with a slit formed and the corners clipped.

Looking now at FIG. 4, it is seen that piece 90 has a plate 91 with a body 100 having four edges 101, 102, 103 and 104, respectively. Each of the four respective corners 105, 106, 107 and 108 are clipped, cut or otherwise removed to eliminate a right angle corner that can be sharp. A slit 115 is formed inward from edge 101 approximately ½ way to edge 103. The slit 115 is preferably located approximately ½ way between edges 102 and 104 and is generally aligned generally parallel to these edges. While ends clipped at approximately 45 degrees are illustrated, the angle of clip could vary without departing from the broad aspects of the present invention. Further, the corners could have a different shape (e.g. round, curved, poly-line, etc.) without departing from the broad aspects of the present invention.

Figure 5:
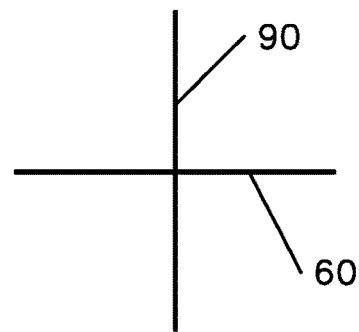
FIG. 5 is an end view of two joined plates of the present invention illustrated before they are formed to have curved profiles.

Turning now to FIG. 5, it is seen that the plates can be joined in manner wherein they are generally perpendicular to each other. This is accomplished by aligning the slits and moving the pieces together along respective axis of the slits.

Figure 6:
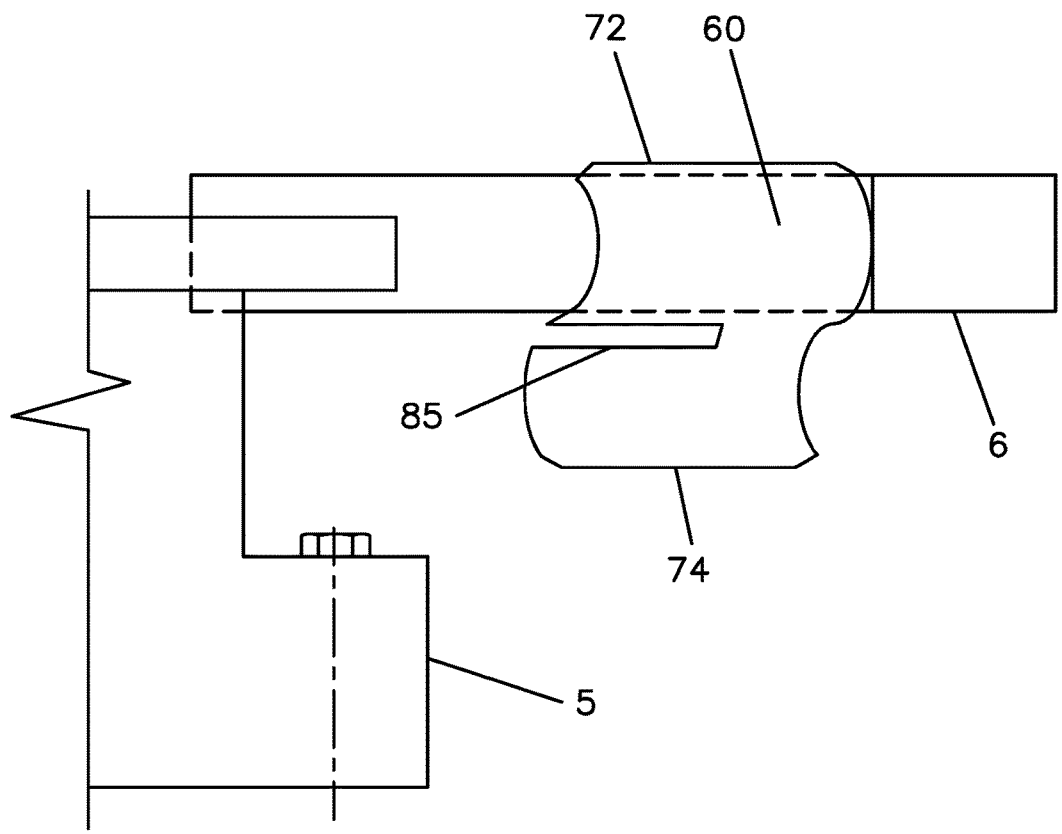
FIG. 6 is a view showing a plate being formed to have a curved profile.

Turning now to FIG. 6, it is seen that a pipe 6 having a round profile with an outer perimeter of approximately 1.5 inches is secured in place with a vice 5. The pieces 60 and 90 are formed to their final profile upon the pipe 6. Each piece 60 and 90 is seen to be formed to have a generally s-shaped profile. The piece 60 is formed to have a maximum lateral dimension greater than two times the size of the pipe (i.e. slightly greater than 3 inches in the illustrated embodiment) and is compressible for use in a 3-inch air intake pipe. The maximum lateral dimension of each piece can be described as an effective length of the respective piece, which in an uncompressed state can be slightly larger than the intended air intake tube diameter. This is accomplished, as seen in FIG. 6, by not forming the outer end of the plate and the area of the plate immediately adjacent the slit to the contour of the pipe.

Looking now to FIG. 7, it is seen that the two pieces 60 and 90 can be joined to form an assembly 120. Assembly 120 has a wall 130 with a distal end 131 and a proximal end 132. The assembly 120 further has a wall 140 with a distal end 141 and a proximal end 142. The assembly 120 still further has a wall 150 with a distal end 151 and a proximal end 152. The assembly 120 still further has a wall 160 with a distal end 161 and a proximal end 162. The walls 130, 140, 150 and 160 are preferably all similarly curved. One preferred curve is an arc shape having a generally constant radius.

A section 170 is formed between walls 130 and 140. A section 171 is formed between walls 140 and 150. A section 172 is formed between walls 150 and 160. A section 173 is formed between walls 160 and 130. The four sections are preferably similar or identical in size.

Figure 9:
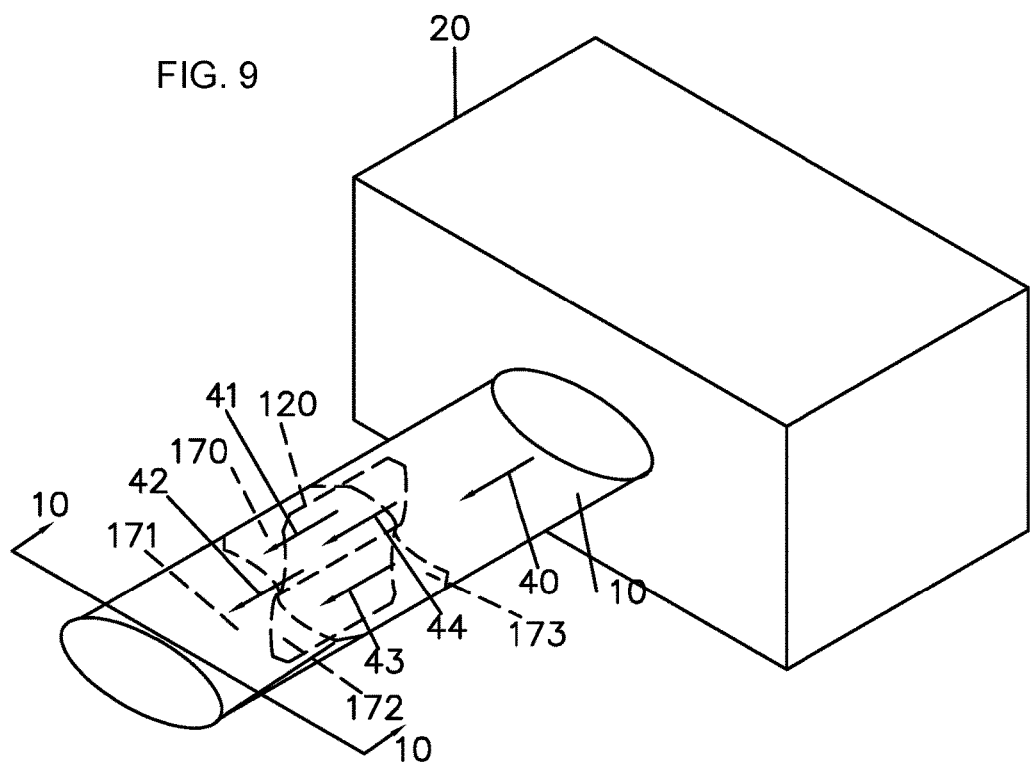
FIG. 9 is a perspective view showing a flow of air divided into four separate segments.
Figure 10:
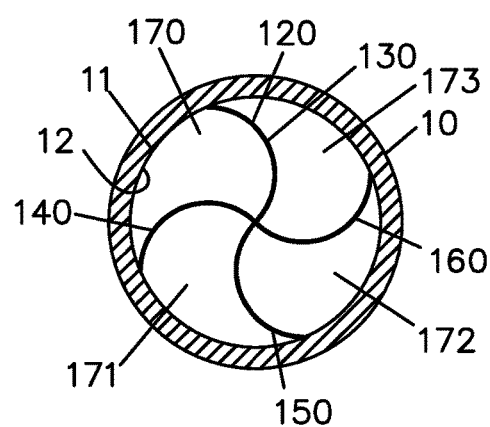
FIG. 10 is a cross-sectional view taken along line 10-10 in FIG. 9.

Turning now to FIGS. 8-10, it is illustrated how the assembly 120 can be inserted into an air induction tube 10. It is appreciated that the pieces 60 and 90 can be formed to have an effective length of slightly larger than approximately 3 inches when uncompressed. Having a slightly oversized effective length of each piece allows the curved walls of the assembly to be slightly compressed radially inwards when being inserted into the air induction tube 10 whereby it acts as a spring to hold the assembly in place. Distal end 131 of wall 130, distal end 141 of wall 140, distal end 151 of wall 150 contact the wall 12 of the air induction tube 10.

As seen in the illustrated embodiment, each individual wall has an effective wall length. In this illustrated embodiment, the effective wall length is equal to ½ the effective piece length, and accordingly is slightly larger than the radius of the air intake tube intended for use with the assembly.

An air flow path 40 is divided into four segments 41, 42, 43 and 44 as the path 40 passes through the four sections 170, 171, 172 and 173, respectively, of the assembly. The divided air paths allow a greater charge to pass through the throttle body. The sections have curved walls.

It is appreciated that while two pieces are shown in the illustrated embodiment, that a larger number of pieces may be used resulting in greater than four sections. Further, it is appreciated that any number of sections could be provided if the device is molded as a single integrated component. It is still further provided that the device can be integrated into an air intake tube as opposed to being an added component. It is still even further provided that while four curved profile sections are shown, that other profile sections could be provided without departing from the broad aspects of the present invention.

Thus it is apparent that there has been provided, in accordance with the invention, a device that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A device for use with an air induction tube upstream of a throttle body, said device comprising:
   a first wall, said first wall being curved along a first wall radial length and straight along a first wall longitudinal length;
   a second wall, said second wall being curved along a second wall radial length and straight along a second wall longitudinal length;
   a third wall, said third wall being curved along a third wall radial length and straight along a third wall longitudinal length; and
   a fourth wall, said fourth wall being curved along a fourth wall radial length and straight along a fourth wall longitudinal length, wherein:
said first wall, said second wall, said third wall and said fourth wall meet at an intersection,
a first air flow path segment is defined by said first wall and said second wall;
a second air flow path segment is defined by said second wall and said third wall;
a third air flow path segment is defined by said third wall and said fourth wall;
a fourth air flow path segment is defined by said fourth wall and said first wall, and
said first air flow path segment, said second air flow path segment, said third air flow path segment and said fourth air flow path segment are each longitudinally straight paths, each symmetrical relative to said intersection and each have an equal volume.

2. The device of claim 1 wherein:
said first wall and said third wall are part of a first piece;
said second wall and said fourth wall are part of a second piece;
said first piece and said second piece being joinable together.

3. The device of claim 2 wherein:
said first piece has a generally S-shaped profile; and
said second piece has a generally S-shaped profile.

4. The device of claim 2 wherein:
said first piece has a first piece slit;
said second piece has a second piece slit; and
said first piece and said second piece being joinable at said first piece slit and said second piece slit.

5. The device of claim 1 wherein:
said first wall has a first wall proximal end;
said second wall has a second wall proximal end;
said first wall intersects said second wall at said intersection where said first wall proximal end and said second wall proximal end meet; and
said first wall is generally perpendicular to said second wall at said intersection of said first wall and said second wall.

6. The device of claim 1 wherein said first wall, said second wall, said third wall and said fourth wall are compressible in a radial direction.

7. The device of claim 1 wherein each of said first wall, said second wall, said third wall and said fourth wall have a curvature approximately equal to an arc.

8. The device of claim 1 wherein:
said first wall has two first wall clipped corners at a first wall distal end;
said second wall has two clipped second wall corners at a second wall distal end;
said third wall has two clipped third wall corners at a third wall distal end; and
said fourth wall has two clipped fourth wall corners at a fourth wall distal end.

9. The device of claim 1 wherein said first wall, said second wall, said third wall and said fourth wall are all equally spaced from each other.

10. A combination, comprising:
a throttle body;
an air intake tube upstream of said throttle body having an air intake tube inside diameter; and
a device, said device separating an air flow path within said air intake tube into four segments, each of said four segments being symmetrical with respect to each other and are equal sized, said device comprising:
four walls each with a proximal end and a distal end;
each of said four walls being curved radially between said proximal end and said distal end, each of said four walls being straight along a respective longitudinal axis; and
each of said four walls has a wall radial effective length in an uncompressed state but is compressible radially, wherein said device can be radially compressed to fit within said air intake tube wherein said air intake tube inside diameter is less than two times the wall radial effective length, wherein each of said four walls meet at an intersection, each of said four walls being perpendicular to two adjacent walls at said intersection.

11. The combination of claim 10 wherein:
said device has a first piece and a second piece;
said first piece has a first piece slit;
said second piece has a second piece slit; and
said first piece and said second piece being joinable at said first piece slit and said second piece slit.

12. The combination of claim wherein each of said four walls has a shape equal to an arc.

13. A method of making a device for insertion into an air induction tube upstream of a throttle body, said method comprising the steps:
providing a first piece;
making a slit in the first piece;
manipulating the first piece until it has a generally S-shaped profile;
providing a second piece;
making a slit in the second piece;
manipulating the second piece until it has a generally S-shaped profile; and
joining the first piece and the second piece to form an assembly, said assembly having:
a first wall, said first wall being curved along a first wall radial length and straight along a first wall longitudinal length;
a second wall, said second wall being curved along a second wall radial length and straight along a second wall longitudinal length;
a third wall, said third wall being curved along a third wall radial length and straight along a third wall longitudinal length; and
a fourth wall, said fourth wall being curved along a fourth wall radial length and straight along a fourth wall longitudinal length,
wherein:
said first wall, said second wall, said third wall and said fourth wall meet at an intersection at right angles,
a first air flow path segment is defined by said first wall and said second wall;
a second air flow path segment is defined by said second wall and said third wall;
a third air flow path segment is defined by said third wall and said fourth wall;
a fourth air flow path segment is defined by said fourth wall and said first wall, and
said first air flow path segment, said second air flow path segment, said third air flow path segment and said fourth air flow path segment are each longitudinally straight paths, each symmetrical relative to said intersection and each have an equal volume.

14. The method of claim 13 wherein the step of manipulating the first piece until it has a generally S-shaped profile comprises creating a first piece with an effective length that is greater than an internal diameter of the air induction tube.

15. The method of claim 13 wherein the step of joining the first piece and the second piece to form an assembly comprises the step of forming an assembly with four like-shaped walls.

16. The method of claim 13 wherein further comprising the steps of:
   clipping corners of said first piece; and
   clipping corners of said second piece.

\* \* \* \* \*